United States Patent [19]
Inoue et al.

[11] Patent Number: 5,777,696
[45] Date of Patent: Jul. 7, 1998

[54] COMPACT PROJECTION APPARATUS FOR GENERATING HIGH-QUALITY IMAGES

[75] Inventors: Shingo Inoue, Kawasaki; Tetsuo Hattori, Yokohama; Sampei Esaki, Sagamihara, all of Japan

[73] Assignee: Nikon Corporation, Tokyo, Japan

[21] Appl. No.: 573,495

[22] Filed: Dec. 15, 1995

[30] Foreign Application Priority Data

Dec. 15, 1994 [JP] Japan ................................. 6-311971
Apr. 26, 1995 [JP] Japan ................................. 7-102501

[51] Int. Cl.$^6$ ................................................ H04N 9/31
[52] U.S. Cl. ...................... 348/752; 348/744; 348/758; 353/34
[58] Field of Search ........................ 348/744, 750, 348/751, 752, 758, 761, 776, 778; 359/40, 41, 42, 59, 74, 72; 313/31, 34, 37; H04N 9/31

[56] References Cited

U.S. PATENT DOCUMENTS 5,260,815  11/1993  Takizawa ............................ 359/41
5,267,029  11/1993  Kurematsu et al. ................ 358/60
5,614,962  3/1997   Nagae et al. ..................... 348/751
5,621,486  4/1997   Doany et al. ..................... 348/756

FOREIGN PATENT DOCUMENTS 556 978     8/1993  European Pat. Off. .
3-063690    3/1991  Japan .

OTHER PUBLICATIONS

Japanese Abstract, Projection Type Display Device, 3-63690..

*Primary Examiner*—Glenton B. Burgess
*Attorney, Agent, or Firm*—Cushman, Darby, Cushman IP Group of Pillsbury Madison & Sutro LLP

[57] ABSTRACT

The projection apparatus of the present invention includes a light source; a three-color separation means such as a cross dichroic prism or a cross dichroic mirror; three first polarization beam splitters; three spatial light modulators; three write image formation devices; and a projection optical system. The three-color separation means and the three first polarization beam splitters all lie in a single plane, and the three first polarization beam splitters are so arranged that a reflected light beam is emitted from each of the three first polarization beam splitters in the same direction.

11 Claims, 11 Drawing Sheets

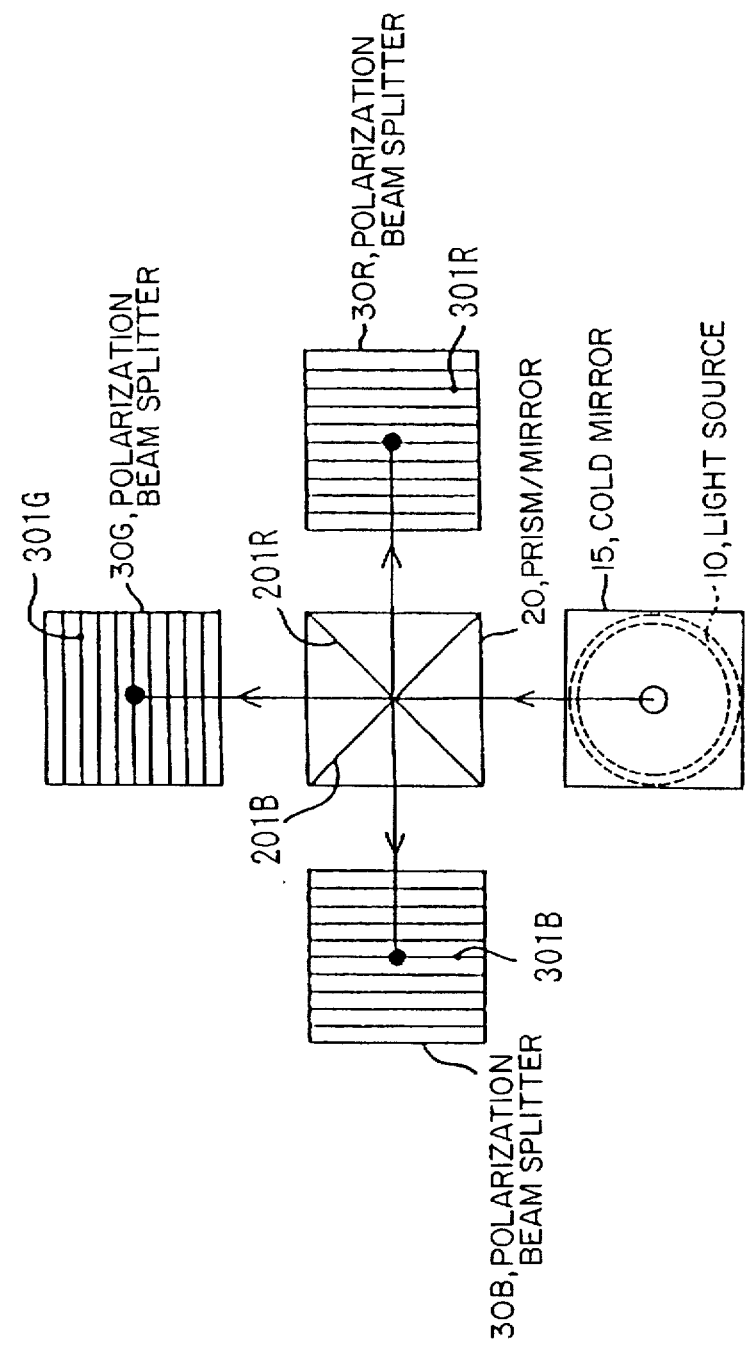

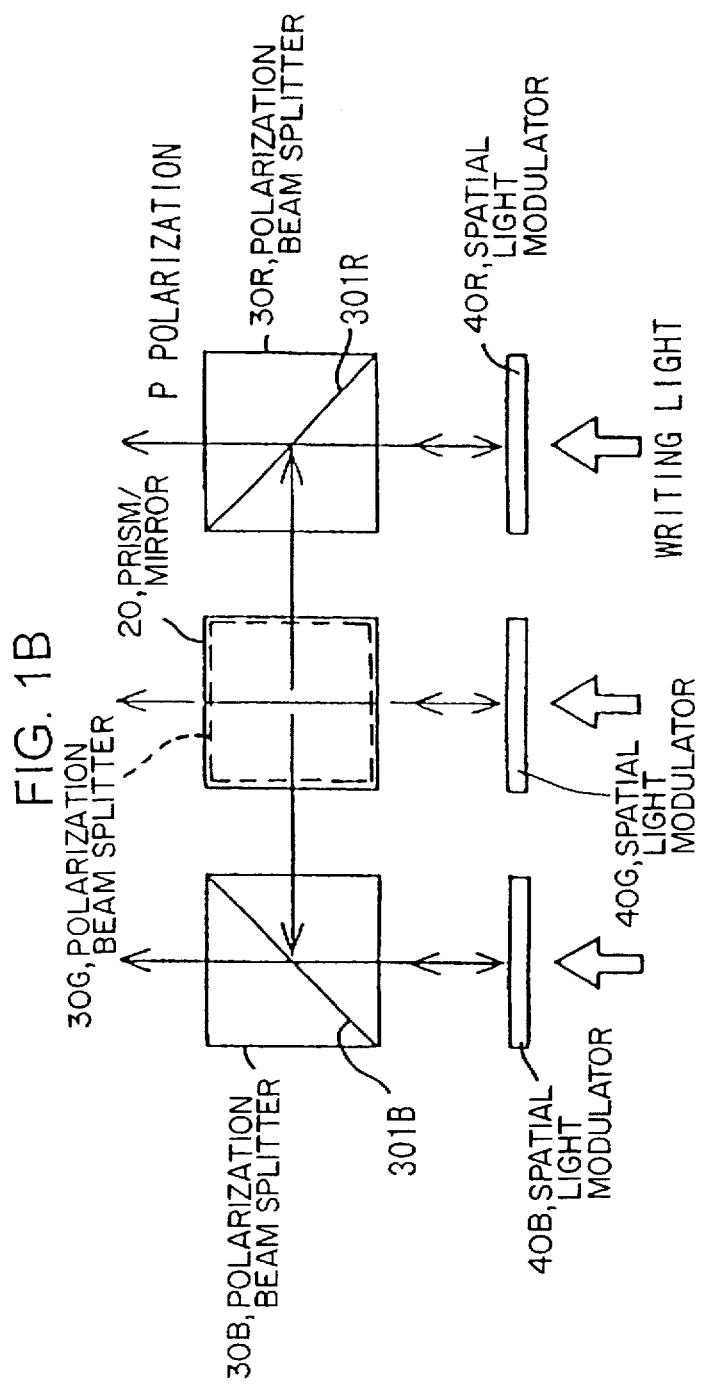

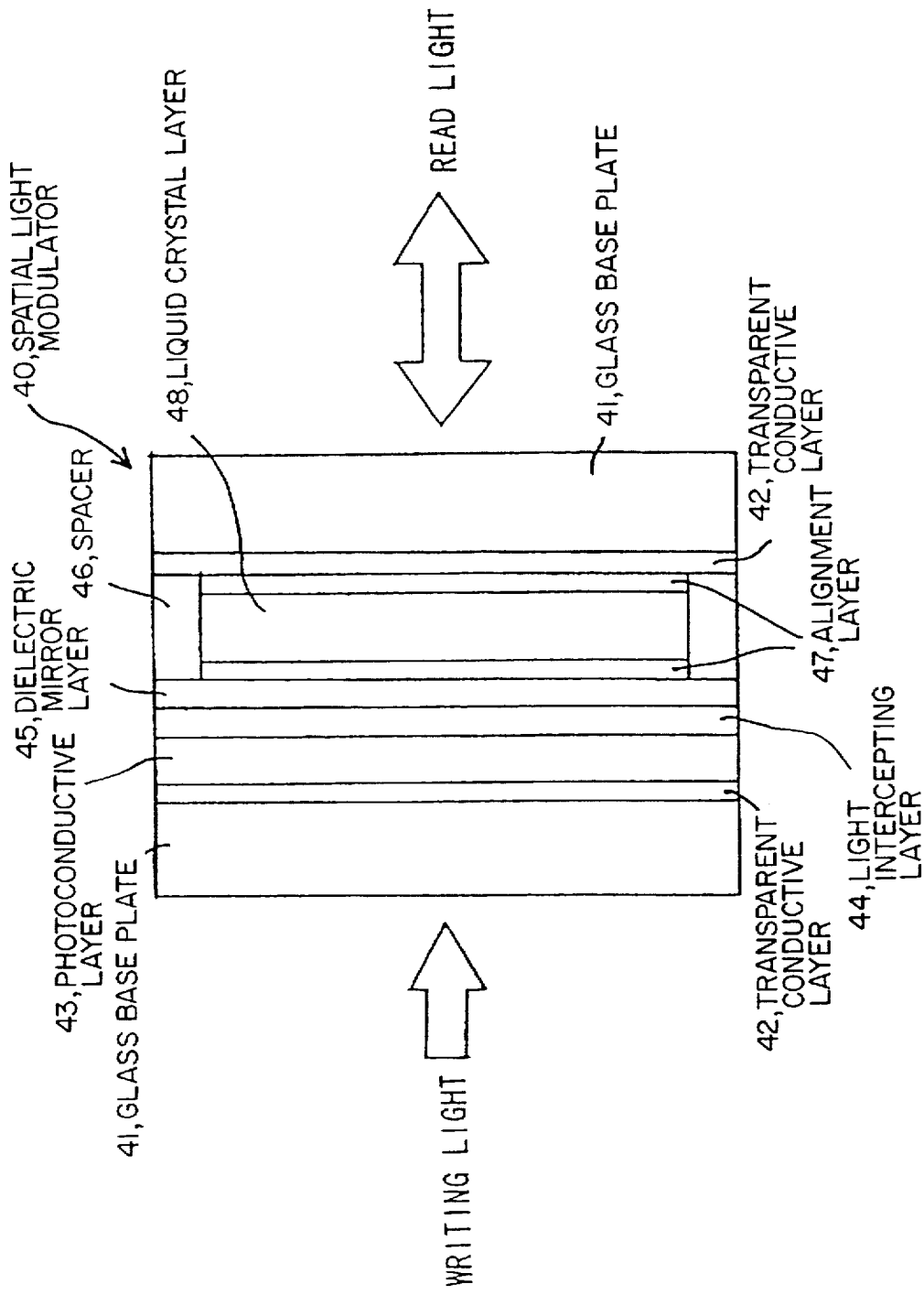

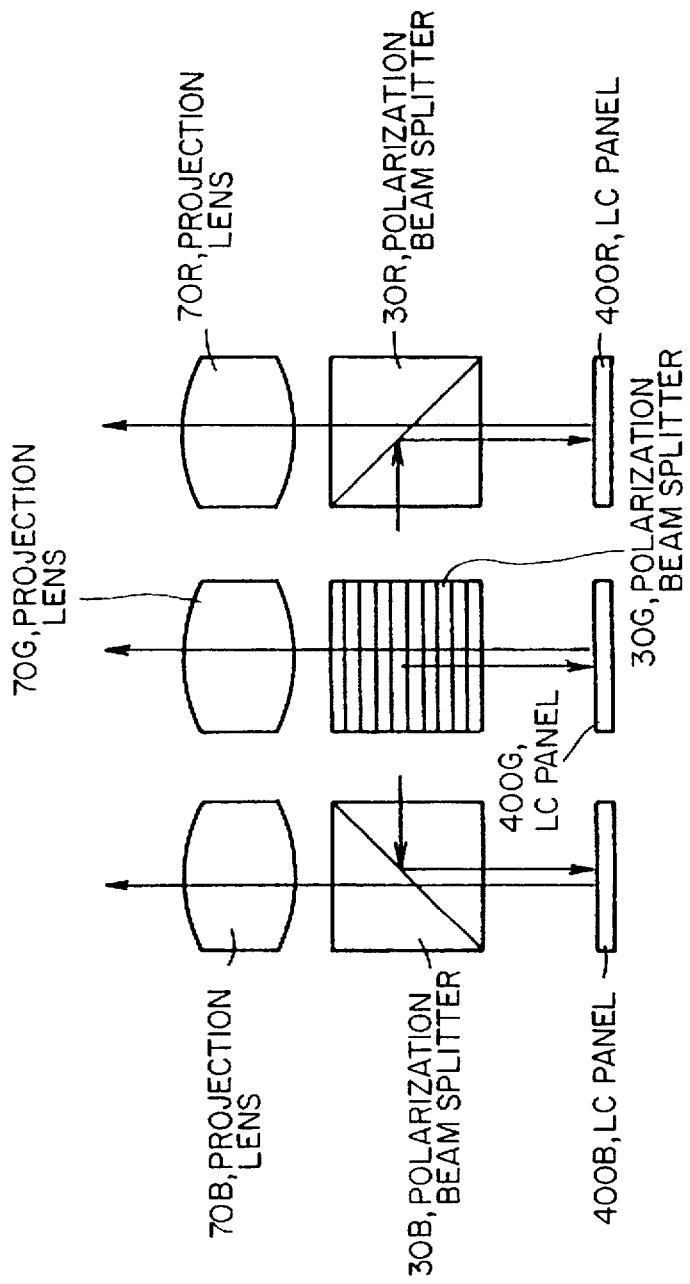

1

COMPACT PROJECTION APPARATUS FOR GENERATING HIGH-QUALITY IMAGES

BACKGROUND OF THE INVENTION

1. Field of the Invention

The present invention relates to a projection apparatus which uses a spatial light modulator.

2. Description of the Related Art

In European Patent Publication No. EP-556978-A1, for example, there has been per se disclosed a type of projection apparatus which uses a spatial light modulator; and FIG. 8 is a simplified perspective constructional view thereof. Referring to FIG. 8, the reference symbols 121R, 121G, and 121B denote three dichroic mirrors which respectively split off beams of red light (R), green light (G), and blue light (B) from a beam of light emitted from a light source 110. For the beams of red light, green light, and blue light there are provided respective reflective type liquid crystal panels 140R, 140G, and 140B which serve as spatial light modulators, respective polarization beam splitters (hereinafter referred to as PBSs) 130R, 130G, and 130B, and respective projection lenses 170R, 170G, and 170B.

The red light beam, the green light beam, and the blue light beam respectively split off by the dichroic mirrors 121R, 121G, and 121B are directed to be incident upon the PBSs 130R, 130G, and 130B respectively and each is polarization split thereby into an S-polarized component light beam and a P-polarized component light beam, and each of these S-polarized components is then incident upon the respective reflective type liquid crystal panels 140R, 140G, and 140B. By inputting an image signal for the corresponding color of light to each of the reflective type liquid crystal panels 140R, 140G, and 140B, the corresponding incident S-polarized light beams are modulated in accordance with these signals, and these modulated light beams are emitted from these reflective type liquid crystal panels 140R, 140G, and 140B to be again incident upon the PBSs 130R, 130G, and 130B respectively. These modulated light beams pass through the corresponding PBS 130R, 130G, and 130B and each is then focused and projected upon a screen not shown in the figure by the respective projection lenses 170R, 170G, and 170B, so that by the superposition of these red, green, and blue images upon the screen a combined full color image is obtained.

With this type of projection device in which, as described above, the light emitted from the light source is split by the use of dichroic mirrors into three light beams of different colors, and in which for each color there is provided a group of elements comprising a dichroic mirror, a PBS, a reflective type liquid crystal panel, and a projection lens, these three element groups are arranged in sequence along a certain direction in the path of the light emitted from the light source, and are mutually separated by certain intervals. For this reason, the problem arises that the dimension of the apparatus along this direction becomes rather great.

Therefore, in order to render the projection apparatus more compact, there has been per se disclosed, for example, in Japanese Patent Laying-Open Publication Serial No. Heisei 3-63690, a projection apparatus of the type of which a simplified constructional view is shown in FIG. 9, in which the light emitted by the light source is split by a single cross dichroic prism into three beams for the three different colors. Referring to FIG. 9, the reference symbol 120 denotes this cross dichroic prism, in which there are formed a blue reflective coating surface 121B and a red reflective coating surface 121R which are disposed at right angles to one another. The light from the light source 110 which is incident upon a PBS 130 is split thereby into an S-polarized component light beam and a P-polarized component light beam, and the S-polarized light beam is directed to be incident upon the cross dichroic prism 120. This S-polarized light beam incident upon the cross dichroic prism 120 is split by the coating surfaces 121B and 121R into a beam of red light, a beam of green light, and a beam of blue light which are directed to be incident upon the reflective type liquid crystal panels 140R, 140G, and 140B respectively, and which are then modulated thereby in the same way as in the projection apparatus of FIG. 8. Each of these modulated light beams is then again incident upon the cross dichroic prism 120, and then passes through the PBS 130 and is projected upon the screen 180 by the projection lens 170.

However, with the projection apparatus of FIG. 9, although individual modulated red, green, and blue light beams are included in the modulated light which is emitted from the cross dichroic prism 120, the polarization separation for these modulated light beams is performed by the single PBS 130. Moreover, since the light beam is incident upon the cross dichroic prism 120 after the light beam was polarization split and then split to three beams of red light, green light and blue light, the quality of polarization of the light beams which are incident upon the reflective type liquid crystal panels 140R, 140G, and 140B is deteriorated due to the slight birefringence effect which the cross dichroic prism 120 generally possess. And also, when the light beams which are reflected and modulated on the reflective type liquid crystal panels 140R, 140G, and 140B pass through the cross dichroic prism 120, the light beams are effected from the slight birefringence effect of the cross dichroic prism 120 again. For these reasons, in spite of the good point that the apparatus has been made more compact as compared with the case of the FIG. 8 projection apparatus in which three PBSs 130R, 130G, and 130B were provided for the three different colored light beams, the negative feature has arisen that the picture quality of the image projected upon the screen 180 is deteriorated.

SUMMARY OF THE INVENTION

The objective of the present invention is to propose a projection apparatus which is compact and yet furnishes an image of high picture quality.

In order to attain this objective, the present invention proposes a projection apparatus, comprising: a three color separation means which separates source light into a red light beam, a green light beam, and a blue light beam; three first polarization beam splitters, each of which separates a corresponding one of the three red, green, and blue light beams from the three color separation means into two linearly polarized light beams, one of which is emitted as a first transmitted light beam and the other of which is emitted as a first reflected light beam; three spatial light modulation means, each of which modulates the reflected light beam emitted by each of the three first polarization beam splitters to a modulated light beam; three write image formation means, each of which forms a write image upon a corresponding one of the three spatial light modulation means; and a projection means which projects upon a screen transmitted light beams of the modulated light beams, wherein the modulated light beams are incident upon the three first polarization beam splitters from the three spatial light modulation means, respectively. The three color separation means and the three first polarization beam splitters all lie in a single plane, and the three first polarization beam splitters are so arranged that the first reflected light beam is emitted from each of the three first polarization beam splitters in the same direction, perpendicular to the plane.

BRIEF DESCRIPTION OF THE DRAWINGS

FIG. 1A, which is a plane view as seen in the direction of the arrows 1A—1A in FIG. 3, is a view showing the basic constructional elements of a first preferred embodiment of the projection apparatus according to the present invention;

FIG. 1B is a front elevational view of the elements in FIG. 1A;

FIG. 2 is a sectional view for explanation of the construction of a spatial light modulator;

FIG. 6 is a sketch showing the construction of a third variant of the first preferred embodiment of the projection apparatus according to the present invention;

DESCRIPTION OF THE PREFERRED EMBODIMENTS

The preferred embodiments of the present invention will now be explained with reference to FIGS. 1A through 7B.

Preferred Embodiment 1

Figure 3:
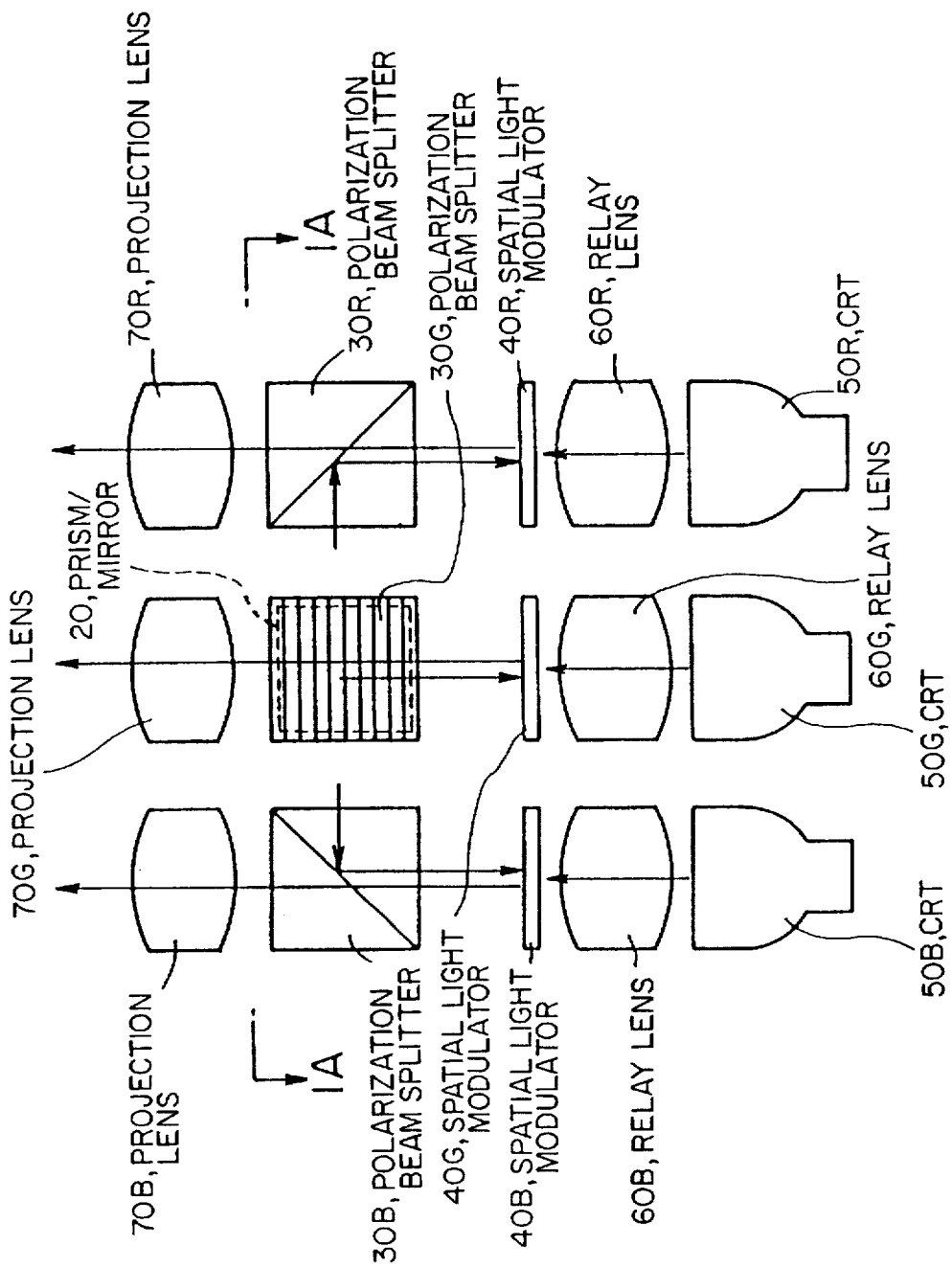
FIG. 3, which is a front elevation view, is a sketch showing the construction of the first preferred embodiment of the projection apparatus according to the present invention.

FIGS. 1A, 1B and 3 are views showing the first preferred embodiment of the projection device according to the present invention. FIG. 3 is a front elevation view showing an overall constructional sketch of this projection apparatus, while FIGS. 1A and 1B are views showing the basic constructional elements of the FIG. 3 projection device which split light into three color light beams and modulate them; FIG. 1A is a plane view as seen in the direction of the arrows 1A—1A in FIG. 3, while FIG. 1B is a front elevational view of the elements in FIG. 1A.

The first preferred embodiment of the projection device according to the present invention will now be explained with reference to FIGS. 1A through 3. In these figures, the reference numeral 10 denotes a light source which comprises a metal halide lamp or the like and an elliptic or parabolic reflector, while 15 is a cold mirror. Light emitted from the light source 10 in the direction perpendicular to the drawing paper in FIG. 1 and towards the viewer is reflected off the cold mirror 15 and is incident upon a cross dichroic prism or cross dichroic mirror 20. The cold mirror 15, the cross dichroic prism or cross dichroic mirror 20, and three PBSs 30R, 30G, and 30B all lie in the same plane, and all of the PBSs 30R, 30G, and 30B are disposed at the same distance from the cross dichroic prism or cross dichroic mirror 20. Within the cross dichroic prism or cross dichroic mirror 20 there are formed a red reflective coating surface 201R which separates out the red light from the incident light from the light source 10 and reflects it, and a blue reflective coating surface 201B which separates out the blue light source light and reflects it; and these coating surfaces 201R and 201B are disposed at right angles to one another. The green light from the light source 10 passes straight through both the red reflective coating surface 201R and the blue reflective coating surface 201B, and is then emitted from the cross dichroic prism or cross dichroic mirror 20. Spatial light modulators (hereinafter termed "SLM"s) 40R, 40G, and 40B, which are modulated with writing light, are disposed directly underneath the PBSs 30R, 30G, and 30B respectively. In the view shown in FIG. 1B the light source 10 and the cold mirror 15 have been omitted, and moreover the PBS 30G which in this view overlays the cross dichroic prism or cross dichroic mirror 20, is shown by dashed lines. Furthermore, in the view shown in FIG. 3, the light source 10 and the cold mirror 15 have been omitted, and moreover the cross dichroic prism or cross dichroic mirror 20, which would prevent the PBS 30G from being seen, is shown by dashed lines.

FIG. 2 is a sectional view for explanation of the construction of one of the spatial light modulators 40. The reference numeral 41 denotes a glass base plate, on one side of which there is formed a transparent conductive layer 42. 43 is a photoconductive layer (for example, a layer of amorphous silicon hydride), while 44 is a light intercepting layer 44 (for example, a layer made of CdTe), and 45 is a dielectric mirror layer. 47 is a alignment layer, and 48 is a liquid crystal layer. 46 is a spacer, and a quantity of liquid crystalline material is enclosed within the space formed by the spacer 46, so as to constitute the liquid crystal layer 48. Now, in this liquid crystal layer 48, the molecules of the liquid crystal material lie in planes substantially parallel to the two alignment layers, and moreover it is so arranged that the alignment directions of the molecules at both two alignment layers are at 45 degrees each other (so called 45 degrees twist).

Moreover, referring to FIG. 3, 50R, 50G, and 50B are CRTs on which are formed write images to be written on the SLMs 40R, 40G, and 40B respectively, and each of these write images passes through a relay lens 60R, 60G, and 60B respectively, to be incident upon the SLMs 40R, 40G, and 40B respectively. Such a relay lens is used for shrinking down the image when writing it, since normally the screen of such a CRT is substantially larger than the size of the corresponding SLM. The modulated light emitted from the SLMs 40R, 40G, and 40B is polarized and split by the PBSs 30R, 30G, and 30B, and the P-polarized light which has passed through each of the PBSs 30R, 30G, and 30B is projected upon a screen not shown in the figures by respective projection lenses 70R, 70G, and 70B.

Next, the operation of the projection apparatus constructed as described above will be explained. Light emitted from the light source 10 is converted into parallel light rays by a collimator lens not shown in the figures, and is reflected off the cold mirror 15 to be incident upon the cross dichroic prism or cross dichroic mirror 20. This incident light is separated by the cross dichroic prism or cross dichroic mirror 20 into beams of the three colors—red light, green light, and blue light—which are emitted to be incident upon the PBSs 30R, 30G, and 30B respectively. The red, green, and blue light beams which are incident respectively upon the PBSs 30R, 30G, and 30B are separated into S-polarized light and P-polarized light beams by the polarization separation portions 301R, 301G, and 301B of the respective PBSs 30R, 30G, and 30B. As shown in FIG. 1B, these separated S-polarized light beams are all emitted in the same direction which is perpendicular to the plane where the PBSs 30R, 30G, and 30B are arranged, and are incident upon the SLMs 40R, 40G, and 40B respectively.

In each of the SLMs 40, an alternating voltage is always applied between the pair of transparent conductive surfaces 42, and, when the read light is incident upon the SLM from the right side as seen in FIG. 2, it passes through the liquid crystal layer 48, is reflected by the dielectric mirror layer 45, again passes through the liquid crystal layer 48, and is then emitted from the SLM 40. When no writing light is present, the divided voltage value which is applied to the liquid crystal layer 48 has not yet become large enough to line up the liquid crystal molecules in the direction of the electric field, and the liquid crystal molecules follow the alignment layer 47 and are oriented thereby. For this reason, the read light which is incident is not subjected to the birefringence effect, and only experiences the rotary polarization effect which depends upon the twist angle. That is, when S-polarized light is incident, it is not modulated by the SLM 40, and thus this S-polarized light is emitted.

On the other hand, when writing light is present, because the impedance of the photoconductive layer 43 is lowered, therefore the divided voltage value which is applied to the liquid crystal layer 48 is elevated and lines up the liquid crystal molecules in the direction of the electric field, and the incident read light is subjected to the birefringence effect in the liquid crystal layer 48. Due to this, when S-polarized light is incident as the read light, P-polarized light is emitted; and, conversely, when P-polarized light is incident as the read light, S-polarized light is emitted. In this manner, when S-polarized light is incident upon the SLM 40, this S-polarized light is modulated into P-polarized light and is emitted from the SLM 40 in areas corresponding to the places where writing light is present.

The S-polarized light of each of the three colors which is incident upon each of the SLMs 40R, 40G, and 40B respectively is modulated according to the presence or absence of the corresponding writing light, and this modulated light is emitted upon the PBSs 30R, 30G, and 30B respectively. The modulated light which is thus incident upon the PBSs 30R, 30G, and 30B is separated by polarization into P-polarized light and S-polarized light, and the P-polarized light passes through and emerges in the upward direction as seen in FIG. 1B, thus to be emitted.

Figure 8:
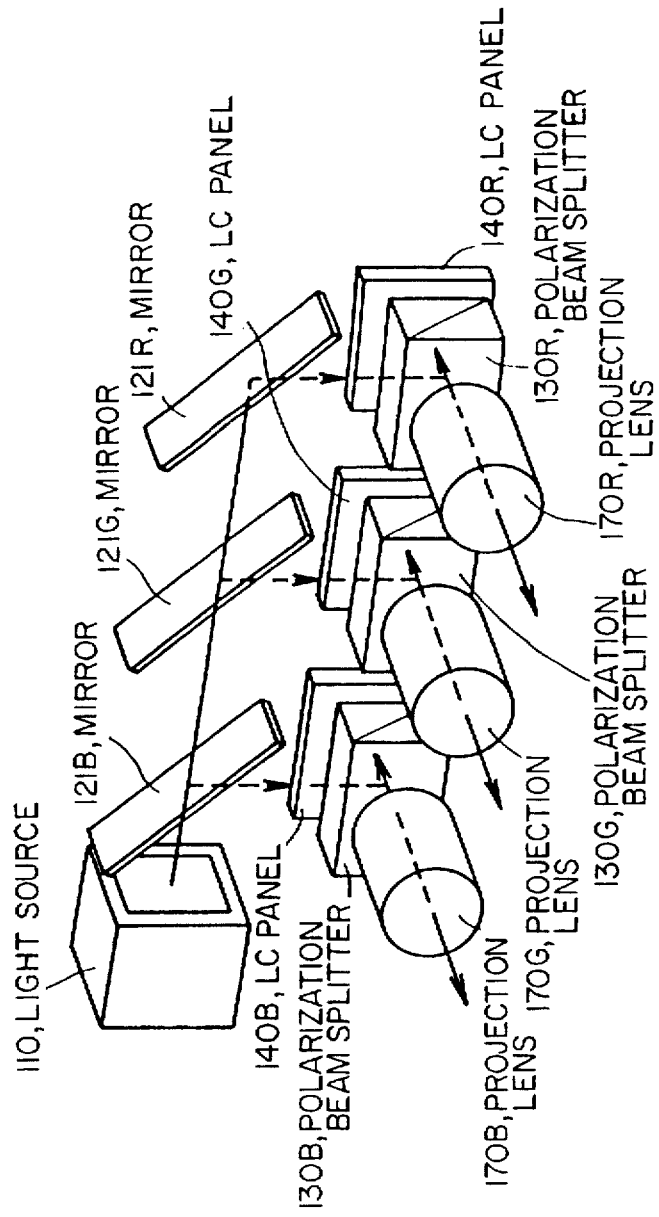
FIG. 8 is a perspective view showing an exemplary first prior art projection apparatus.
Figure 9:
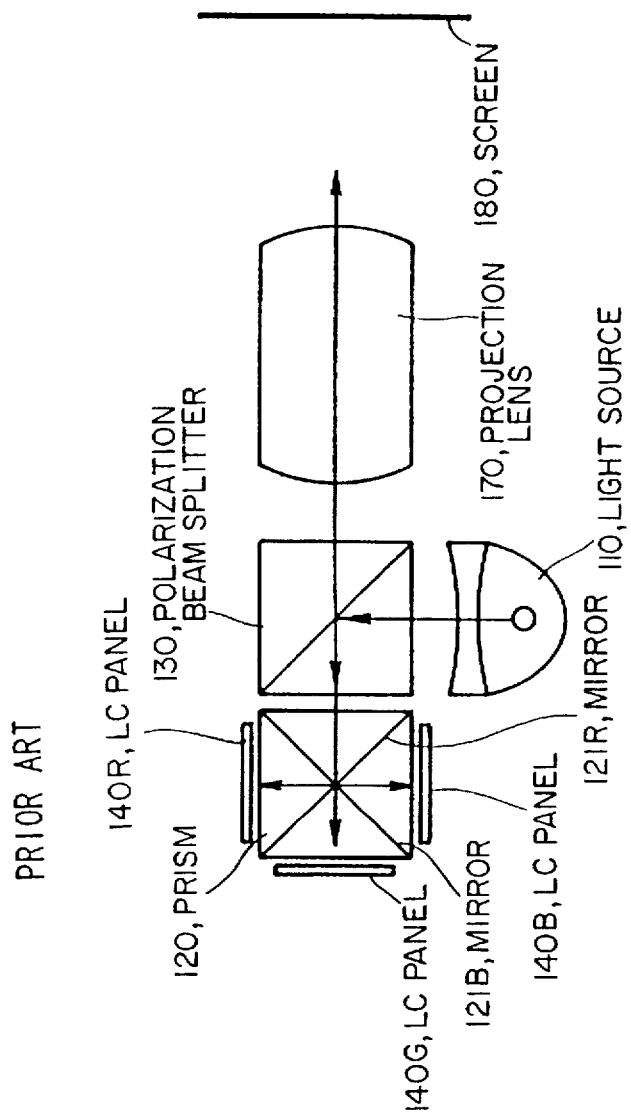
FIG. 9 is a view showing an exemplary second prior art projection apparatus.

In this first preferred embodiment, the three PBSs 30R, 30G, and 30B lie in the same plane around the cross dichroic prism or cross dichroic mirror 20 as a center, and are arranged so that their distances from the cross dichroic prism or cross dichroic mirror 20 are all equal; and, moreover, the SLMs 40R, 40G, and 40B for the red light, the green light, and the blue light respectively, the PBSs 30R, 30G, and 30B, and the projection lenses 70R, 70G, and 70B, are all arranged as coaxial along the projection direction. For this reason, whereas with the prior art projection apparatus shown in FIG. 8 the lengths of the light paths from the light source 110 to each of the SLMs 140B, 140R, and 140G were all different, with this projection apparatus according to the first preferred embodiment of the present invention the lengths of the light paths from the light source 10 to each of the SLMs 40R, 40G, and 40B are all equal, and moreover it is possible for the distance taken up by this apparatus to be set to be minimized. Accordingly it is possible to set the length of the light path to be the minimum for this type of projection apparatus which uses a projection lens for each of the red light, the green light, and the blue light; and it is possible to make the projection apparatus more compact, while maintaining a picture quality identical with that available from the prior art projection apparatus shown in FIG. 8. Moreover, since it is possible to set the lengths of the three light paths for the light of each color from the light source via the cross dichroic prism or cross dichroic mirror, the PBSs, the SLMs, and again the PBSs to the projection lens all to be the same, and moreover to be as short as possible, thereby the unevenness due to differences in the lengths of the light paths is prevented, and further, by comparison with the prior art projection apparatus shown in FIG. 9 in which the cross dichroic prism and the PBSs all lie on the same axis along the projection direction, it is possible to reduce the depth dimension of the projection apparatus.

Figure 4:
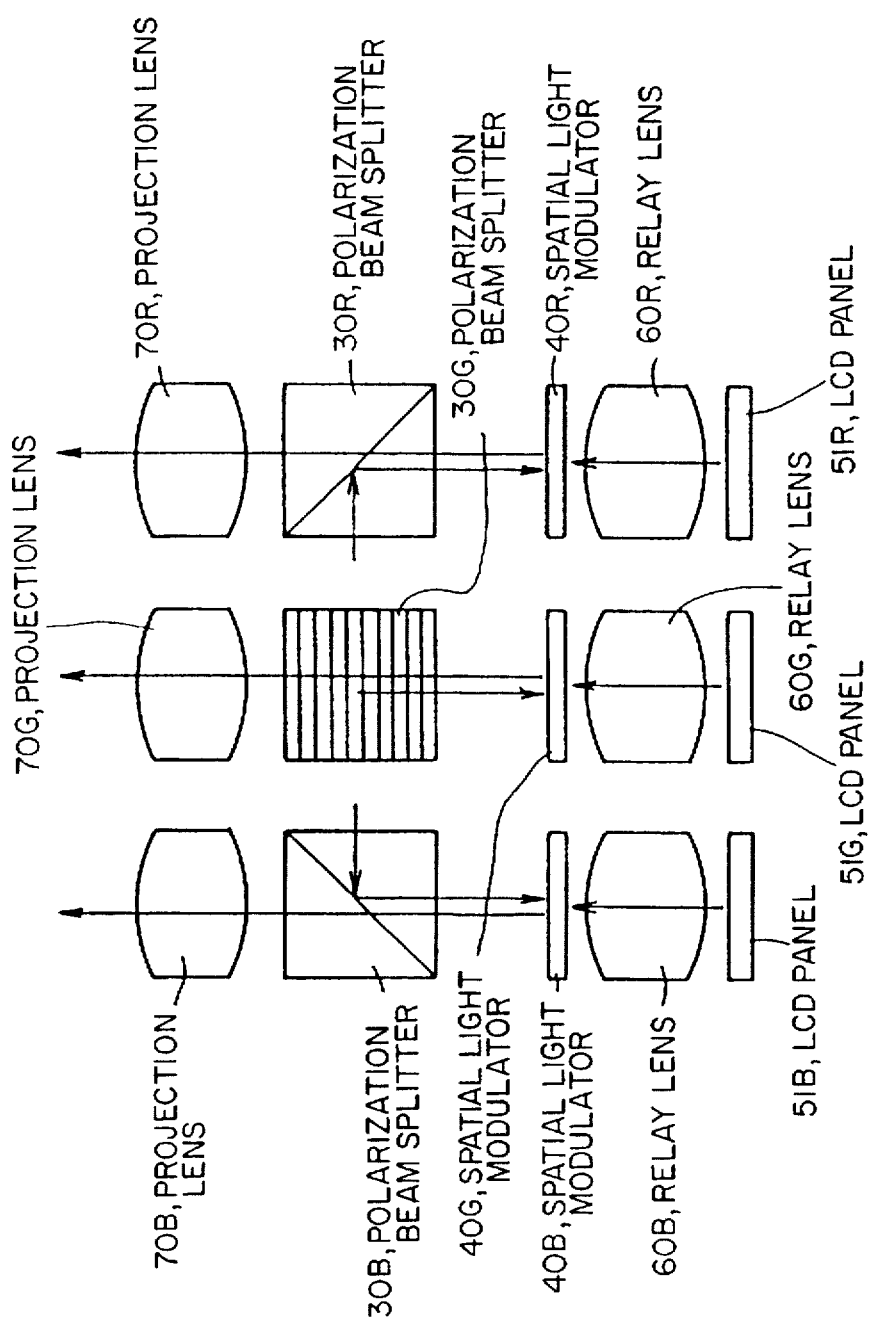
FIG. 4 is a sketch showing the construction of a first variant of the first preferred embodiment of the projection apparatus according to the present invention.

Furthermore, FIG. 4 is a sketch showing the construction of a first variant of the first preferred embodiment shown in FIG. 3. In this variant embodiment, rather than the three CRTs 50R, 50G, and 50B being used as the devices for forming the write images, three LCD panels 51R, 51G, and 51B are used instead. In this variant embodiment as well, since the SLMs, the PBSs and the projection lens are arranged in a manner identical to that for the first preferred embodiment shown in FIG. 3, the same advantages and benefits are obtained as with that first preferred embodiment.

Figure 5:
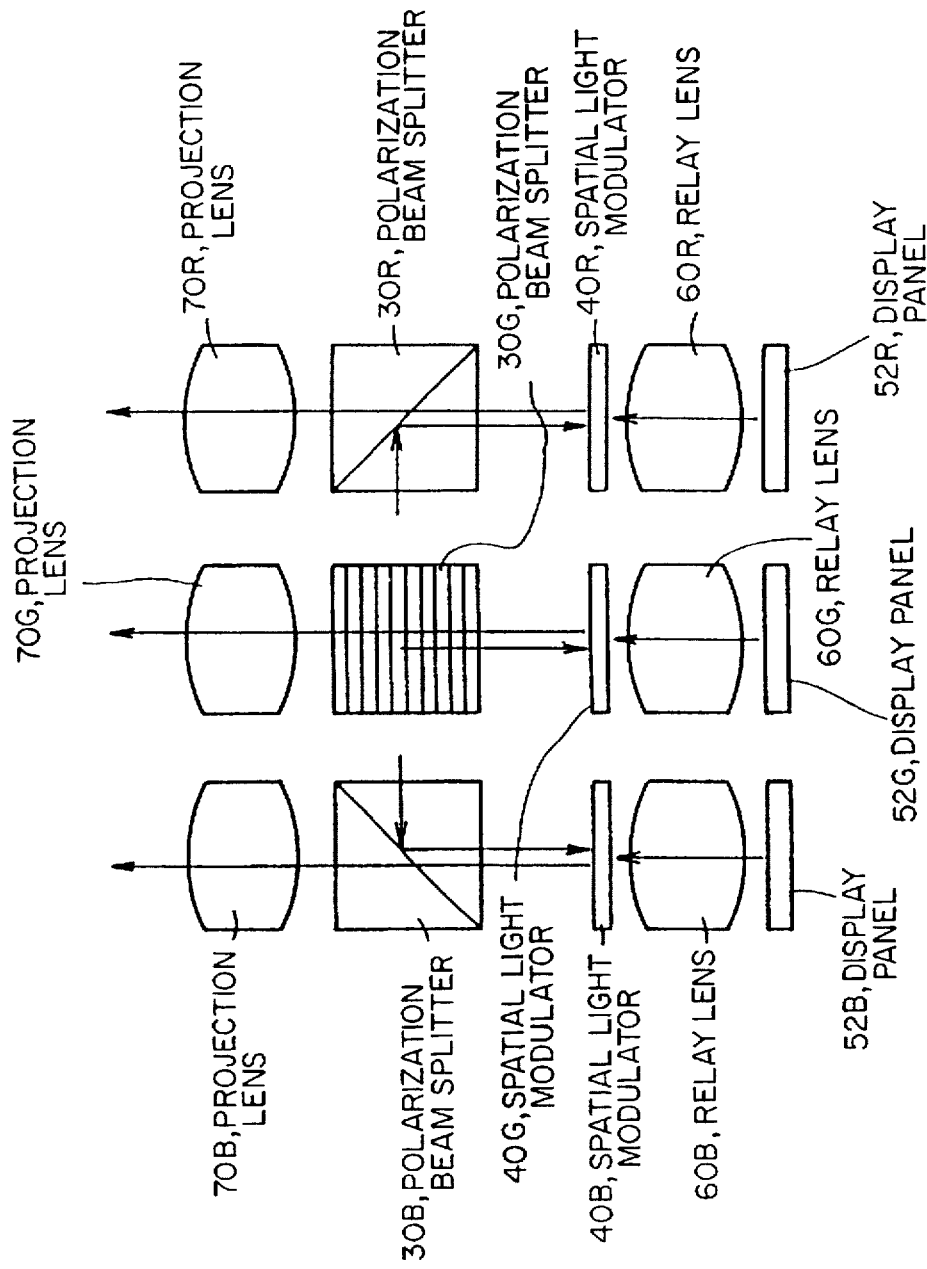
FIG. 5 is a sketch showing the construction of a second variant of the first preferred embodiment of the projection apparatus according to the present invention.

Furthermore, FIG. 5 is a sketch showing the construction of a second variant of the first preferred embodiment shown in FIG. 3. In this variant embodiment, rather than the three CRTs 50R, 50G, and 50B being used as the devices for forming the write images, three electroluminescent display panels 52R, 52G, and 52B are used instead. In this variant embodiment as well, since the SLMs, the PBSs and the projection lens are arranged in a manner identical to that for the first preferred embodiment shown in FIG. 3, the same advantages and benefits are obtained as with that first preferred embodiment.

Furthermore, FIG. 6 is a sketch showing the construction of a third variant of the first preferred embodiment shown in FIG. 3. In this variant embodiment, rather than the three combinations of a SLM 40R, 40G and 40B, a relay lens 60R, 60G and 60B, and a CRT 50R, 50G and 50B being used, three reflective type liquid crystal panels 400R, 400G, and 400B are used instead. In this variant embodiment as well, since the reflective type liquid crystal panels are arranged in the same position as the position of the SLMs shown in FIG. 3, and the PBSs and the projection lens are arranged in a manner identical to that for the first preferred embodiment shown in FIG. 3, the same advantages and benefits are obtained as with that first preferred embodiment.

Preferred Embodiment 2

Figure 7A:
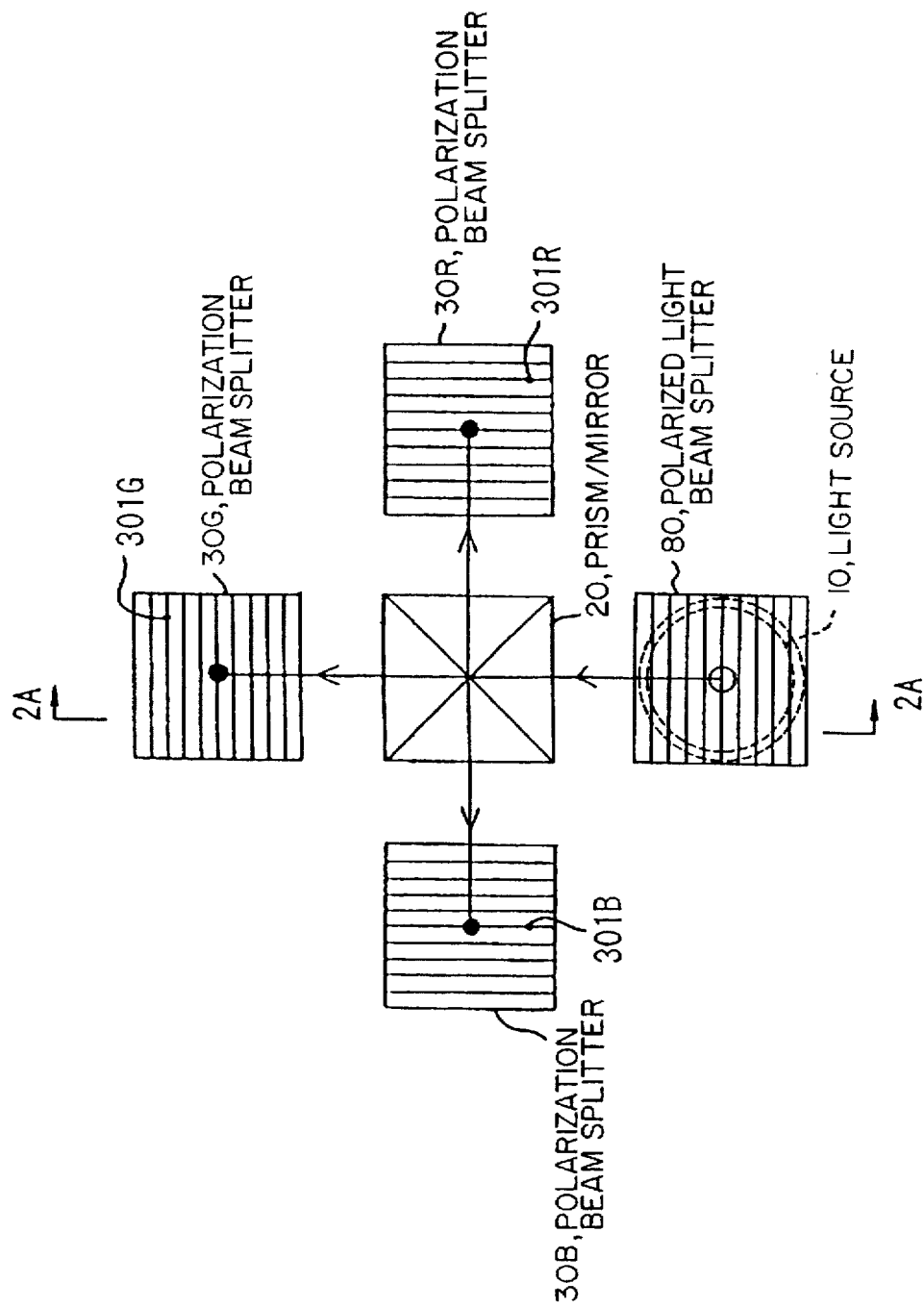
FIG. 7A is a plane view showing the basic constructional elements of a second preferred embodiment of the projection apparatus according to the present invention.
Figure 7B:
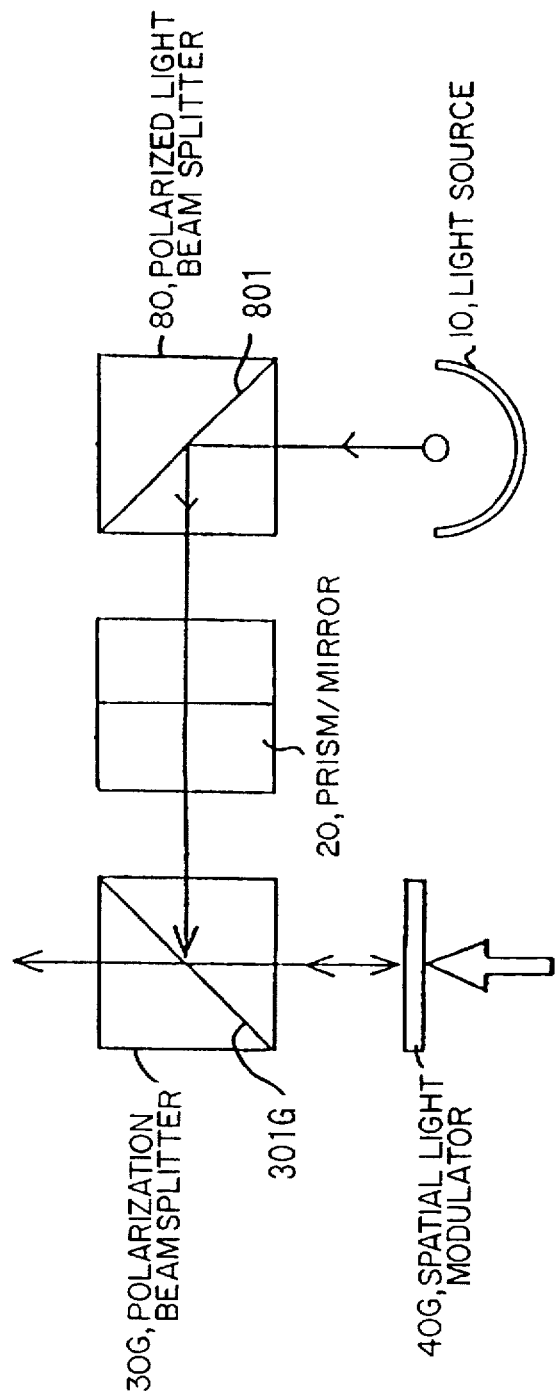
FIG. 7B is a front elevational view as seen in the direction of the arrows 2A—2A in FIG. 7A.

The second preferred embodiment of the present invention will now be explained with reference to FIGS. 7A and 7B, which correspond to FIGS. 1A and 1B for the first preferred embodiment and is a view showing the basic constructional elements of this second preferred embodiment. Moreover, the portions of this projection apparatus other than these basic constructional elements are the same as in the first preferred embodiment projection apparatus shown in FIG. 3. FIG. 7A is a plane view, while FIG. 7B is a front elevational view as seen in the direction of the arrows 2A—2A in FIG. 7A. In the FIG. 7B view, the PBSs 30B and 30R and the SLMs 40B and 40R have been omitted. In this second preferred embodiment, a polarized light beam splitter (PBS) 80 which comprises a polarized light separation portion 801 is disposed in the position which was occupied by the cold mirror 15 of FIG. 1A. Apart from this point, the construction is the same as that of the first preferred embodiment shown in FIGS. 1A and 1B.

Light rays which are emitted from the light source 10 and are incident upon the PBS 80 are separated into S-polarized light and P-polarized light by the PBS 80, and the S-polarized light which is reflected by the polarized light separation portion 801 is emitted towards the cross dichroic prism or cross dichroic mirror 20. This S-polarized light which is incident upon the cross dichroic prism or cross dichroic mirror 20 is separated into its three colors—red color light, green color light, and blue color light—and these three components are respectively incident upon the PBSs 30R, 30G, and 30B and again are separated by polarization. Moreover, since in actual fact the reflected light emitted from the PBS 80 is S-polarized light which has a component of P-polarized light mixed in with it, therefore the R light, the G light, and the B light which are emitted from the cross dichroic prism or cross dichroic mirror 20 also have certain amounts of P-polarized light mixed in with them. These beams of R light, G light, and B light are again polarization separated by the PBSs 30R, 30G, and 30B respectively, and are emitted to the SLMs 40R, 40G, and 40B after their P-polarized components have been reduced. The modulated light beams from the SLMs 40R, 40G, and 40B, after being polarization separated by the PBSs 30R, 30G, and 30B, are projected upon a screen not shown in the figures, in the same manner as in the first preferred embodiment.

The same advantages and benefits are obtained with this second preferred embodiment as with the first preferred embodiment described above. Furthermore, since the light from the light source is polarization separated by the PBS 80 and the P-polarized component mixed in with the S-polarized component is reduced before it is divided up into three colors by the cross dichroic prism or cross dichroic mirror 20, i.e., since the light from the light source is subjected to polarization separation twice by the PBS before it is incident upon the SLMs 40R, 40G, and 40B, therefore the amount of the P-polarized component mixed in with the read light which is incident upon the SLMs 40R, 40G, and 40B is made extremely small, as compared with the case of a projection apparatus in which the light is only subjected to polarization separation once, and this makes possible an improvement in the contrast of the projected image.

Moreover, with this second preferred embodiment, the light emitted from the light source 10 is polarization separated by the PBS 80, and its reflected light is incident upon the cross dichroic prism or cross dichroic mirror 20; but it would also be possible, as an alternative, to dispose the PBS 80 upon the optical axis between the cold mirror 15 and the cross dichroic prism or cross dichroic mirror 20 of FIG. 1A. And, in this case, the light reflected by the cold mirror 15 is polarization separated by the PBS 80, and its transmitted light is incident upon the cross dichroic prism or cross dichroic mirror 20. In this case, the polarized light separation portion 801 should be arranged so that the polarized light which has passed through the polarized light separation portion 801 of the PBS 80 is reflected by the PBSs 30R, 30G, and 30B.

We claim:

1. A projection apparatus, comprising:

a light source;

a three color separation means which separates source light from said light source into a red light beam, a green light beam, and a blue light beam;

three first polarization beam splitters, each of which separates a corresponding one of said three red, green, and blue light beams from said three color separation means into two linearly polarized light beams, one of which is emitted as a first transmitted light beam and the other of which is emitted as a first reflected light beam;

three spatial light modulation means, each of which modulates said reflected light beam emitted by each of said three first polarization beam splitters to a modulated light beam;

three write image formation means, each of which forms a write image upon a corresponding one of said three spatial light modulation means; and a projection means which projects upon a screen transmitted light beams of said modulated light beams, wherein said modulated light beams are incident upon said three first polarization beam splitters from said three spatial light modulation means, respectively, wherein said three color separation means and said three first polarization beam splitters all lie in a single plane, and said three first polarization beam splitters are so arranged that said first reflected light beam is emitted from each of said three polarization beam splitters in the same direction, perpendicular to said plane.

2. A projection apparatus according to claim 1, further comprising:

a second polarization beam splitter disposed between said source light and said three color separation means, which separates source light into two linearly polarized light beams, one of which is emitted as a second reflected light beam and the other of which is emitted as a second transmitted light beam, wherein one of said second reflected light beam and said second transmitted light beam emitted from said second polarization beam splitter is incident upon said three color separation means.

3. A projection apparatus, comprising:

a light source;

a three color separation device which separates source light from said light source into a red light beam, a green light beam, and a blue light beam;

three first polarization beam splitters, each of which separates a corresponding one of said three red, green, and blue light beams from said three color separation device into two linearly polarized light beams, one of which is emitted as a first transmitted light beam and the other of which is emitted as a first reflected light beam;

three spatial light modulators, each of which modulates said reflected light beam emitted by each of said three first polarization beam splitters to a modulated light beam;

three write image formation devices, each of which forms a write image upon a corresponding one of said three spatial light modulators; and a projection optical system which projects upon a screen transmitted light beams of said modulated light beams, wherein said modulated light beams are incident upon said three first polarization beam splitters from said three spatial light modulators, respectively, wherein said three color separation device and said three first polarization beam splitters all lie in a single plane, and said three first polarization beam splitters are so arranged that said first reflected light beam is emitted from each of said three first polarization beam splitters in the same direction, perpendicular to said plane.

4. A projection apparatus according to claim 3, further comprising:

a second polarization beam splitter disposed between said source light and said three color separation device, which separates source light into two linearly polarized light beams, one of which is emitted as a second reflected light beam and the other of which is emitted as a second transmitted light beam, wherein one of said second reflected light beam and said second transmitted light beam emitted from said second polarization beam splitter is incident upon said three color separation device.

5. A projection apparatus according to claim 3, wherein distances between said light source and said three first polarization beam splitters are optically equal.

6. A projection apparatus according to claim 3, wherein said three color separation device is a cross dichroic prism.

7. A projection apparatus according to claim 3, wherein said three color separation device is a cross dichroic mirror.

8. A projection apparatus according to claim 3, wherein each of said write image formation devices includes a CRT.

9. A projection apparatus according to claim 3, wherein each of said write image formation devices includes a liquid crystal display panel.

10. A projection apparatus according to claim 3, wherein each of said write image formation devices includes an electroluminescent display panel.

11. A projection apparatus, comprising:

a light source;

a three color separation device which separates source light from said light source into a red light beam, a green light beam, and a blue light beam;

three first polarization beam splitters, each of which separates a corresponding one of said three red, green, and blue light beams from said three color separation device into two linearly polarized light beams, one of which is emitted as a first transmitted light beam and the other of which is emitted as a first reflected light beam;

three reflective type liquid crystal panels; each of which modulates said reflected light beam emitted by each of said three first polarization beam splitters to a modulated light beam based upon image data signals;

a projection optical system which projects upon a screen transmitted light beams of said modulated light beams, wherein said modulated light beams are incident upon said three first polarization beam splitters from said three reflective type liquid crystal panels, respectively, wherein said three color separation device and said three first polarization beam splitters all lie in a single plane, and said three first polarization beam splitters are so arranged that said first reflected light beam is emitted from each of said three first polarization beam splitters in the same direction, perpendicular to said plane.

* * * * *